United States Patent

[11] 3,617,180

[72] Inventor Clemens Streck
 Loudonville, N.Y.
[21] Appl. No. 753,744
[22] Filed Aug. 19, 1968
[45] Patented Nov. 2, 1971
[73] Assignee GAF Corporation
 New York, N.Y.

[54] AZOIC DYE COMPOSITION CONTAINING OXYGEN-CONTAINING PRIMARY AMINES AND PROCESS OF USING SAME
 16 Claims, No Drawings
[52] U.S. Cl. .................................................... 8/45,
 8/46
[51] Int. Cl. .................................................... D06p 1/02

[50] Field of Search ............................................ 8/45

[56] References Cited
 UNITED STATES PATENTS
 2,232,405 2/1941 Schmelzer .................... 8/45

Primary Examiner—George F. Lesmes
Assistant Examiner—Patricia C. Ives
Attorneys—Walter C. Kehm and Samson B. Leavitt ABSTRACT: A process for the neutral developing of azoic colors and a dye composition which employs said process, which process comprises the use of an oxygen-containing primary amine in combination with coupling components and diazo amino compounds.

AZOIC DYE COMPOSITION CONTAINING OXYGEN-CONTAINING PRIMARY AMINES AND PROCESS OF USING SAME

This invention relates to an improved process for neutral developing of azoic colors and to the compositions used therein.

More specifically, this invention relates to an improved process for neutral developing of azoic colors wherein the dyeing or printing composition contains a sulfonated long chain carboxylic acid and a water soluble nitrogenous oxygen-containing organic base.

Prior art processes for developing azoic compositions may be broadly classified into acidic developing and neutral developing.

In acidic developing the diazo compound and the coupling component are dissolved in a caustic alkali solution. The solution is thereafter made into a suitable paste by the addition of a thickening agent such as starch or gum tragacanth. After the paste is applied to the textile, as by printing, the dye is developed by exposing the textile to acidic steam. The acidic steam operates to split the diazo moiety, and the thus freed diazo couples with the coupling component to produce the color. Generally, acetic acid is used as the acid component in the steam. While acidic developing produces the desired dyed effect, attendant therewith are several disadvantages, primary of which is the offensive smell and irritating effect of the acid in the steam vapors. Consequently, prior art workers have attempted to utilize a neutral steam developing process, thereby excluding the use of any acid.

Various processes for the neutral developing of azoic dyes have been utilized by prior art workers. The basic approach has been the use of an alkaline base which, after printing, evaporates on exposure to neutral steam, thereby lowering the pH and enabling the diazo to split and couple with the coupling component and subsequently produce the color. These processes include the addition to the dye preparation of organic acids, phosphoric acid and salts of acids as shown in U.S. Pat. No. 1,951,571; the use of amine salts and amides in the print composition as illustrated in U.S. Pat. No. 2,008,966; the replacement of caustic alkali by a volatile amine, such as diethylamine, as taught by U.S. Pat. No. 2,125,087; and the use of an oxygen containing water-soluble nitrogenous organic base, e.g. oxygen containing sec- and tert-amino compounds, such as diethylaminoethanol or diethylaminoethanol methyl ether, disclosed in U.S. Pat. No. 2,232,405.

All of the neutral developing techniques described above suffer from several disadvantages. None of the methods, for example, are satisfactory for use with slow splitting diazo compounds, such as 5-chloro-o-toluidine diazo stabilized with sarcosine, and 5-chloro-o-anisidine diazo stabilized with sarcosine. Furthermore, the shades are duller than when the same dyestuff components are developed in acid steam. The duller shades are attributable to the necessity of using a higher moisture content in neutral developing than in acidic developing and also because the dissociation of the diazo compound occurs at a comparatively higher pH in neutral developing than in acidic developing.

It has been found in accordance with the present invention that, by using a printing or dyeing composition containing a water soluble primary amine having a total of three to five carbon atoms and the formula $R-O-(CH_2)_n-NH_2$ wherein R is an alkyl of one to four carbon atoms and $n$ is an integer having the value of from 2 to 4 and also preferably a sulfonated long chain carboxylic acid, the disadvantages of the prior art neutral developing process may be overcome.

Accordingly, it is an object of this invention to provide a novel neutral developing azo dye composition and process for using the same.

Another object of this invention is to provide a neutral developing azo dye composition and process which is remarkably effective in cleaving slow-splitting diazo compounds.

A further object of this invention is to provide a neutral developing azo dye composition and process wherein the colors developed are as consistently as bright as that produced in the conventional acidic developing composition and process.

These and other objects are accomplished by a composition containing a volatile water-soluble ether of an oxygen containing primary amine and also preferably a sulfonated long-chain carboxylic acid.

These and other objects of the instant invention will be evident from the following more detailed description thereof.

We have found that oxygen-containing primary amines which have the general formula:

$$R-O-(CH_2)_n-NH_2$$

wherein R represents an alkyl radical having from 1–4 carbon atoms such as methyl, ethyl, propyl, butyl, isopropyl, isobutyl, etc., and $n$ represents an integer of from 2–4 and wherein the total carbon atoms in the molecule range from 3–5 are effective for use as volatile amines in the developing of azoic colorations employing diazo amino compounds. These primary amines, which are employed in connection with the instant invention, are less offensive in odor and are much more effective, especially when employed in connection with slow splitting diazo amino compounds, than the amines such as alkyl amines or oxygen-containing secondary and tertiary amines previously employed in the art. The primary amines of the instant invention are more highly volatile than the oxygen-containing secondary and tertiary amines and in addition have a greater solvent effect on the azoic solutions or pastes. Furthermore, the pad liquors of the instant invention remain more fluid than those in which oxygen-containing bases employed in the prior art are used. Amines which may be employed in connection with the instant invention include, but are not limited to, amines such as methoxyethylamine, methoxypropylamine, methoxybutylamine, ethoxyethylamine, ethoxypropylamine, methoxybutylamine, propoxyethylamine, and any other amine which conforms with the above general formula. The preferred amine for use in the instant invention is one which has a volatility such that it gives excellent color results under the usual conditions employed in the neutral developing of azoic colors. While all the amines listed are useful in connection with the instant invention, the preferred amine is methoxypropylamine.

In addition to the use of the primary amine in the neutral developing of azoic colors, but not necessary therefor, we have also found that if one incorporates a sulfonated long-chain carboxylic acid one obtains a closer control and an improved time factor in the operation of the instant invention.

The sulfonated long-chain carboxylic acids are preferably the $C_{12}$ to $C_{18}$ sulfonated alkyl carboxylic acids such as α-sulfolauric acid, α-sulfotridecoic acid, α-sulfomyristic acid, α-sulfopentadecanoic acid, α-sulfopalmitic acid, α-sulfomargaric acid, and α-sulfostearic acid. In addition to the α-sulfonated carboxylic acids disclosed above, the term "sulfonated long-chain carboxylic acids having from 12 to 18 carbon atoms" is intended to include those compounds having one or more substituted sulfonated groups on any of the carbon atoms such as, for example the "β", "γ", "δ", etc., position. The choice of acid and the position and number of sulfonated groups are dependent, for the most part, on prevailing economic considerations and the availability of the particular acid utilized.

The preferred method of carrying out the instant invention is to prepare a solution containing approximately equivalent amounts of a diazo amino compound and a coupling compound in water and a solvent system. When the volatile amine of the instant invention is employed it is not usually necessary to add any fixed alkali so as to obtain a solution since the volatile amine has a relatively high solvent power. However, a small amount of fixed alkali may be employed if desired. The amine may be employed in amounts of from about 5 to 50 percent based upon the weight of the solution. If a long-chain sulfonated acid is employed it may also be added to the solution in an amount of from 0 to 20 percent based on the weight of the solution. Furthermore, other adjuvants such as urea, surfactants and thickening agents may be employed. The useful thickening agents include, but are not limited to, starch, tragacanth, caltax gum, etherified starch, or other similar thickeners. The order in which the components are added to the solution is immaterial to the operation of the instant invention.

Diazotizable amines useful in connection with the instant invention are those which are useful in the production of azoic colors. These amines are free from water-solubilizing sulfonic and carboxylic acid groups and include, but are not limited to:

2-methoxy-naphthylamine
2-methoxy-aniline
2-phenoxy-aniline
2-ethoxy-aniline
2-chlor-5-methyl-aniline
2-methyl-aniline
2-methoxy-5-methyl-aniline
2-methoxy-4-chlor-5-methyl-aniline
2:5-dimethoxy-aniline
2:5-diethoxy-aniline
2:5-dimethoxy-4-chlor-aniline
5-brom-2-methoxy-aniline
3-iodo-6-methoxy-aniline
3-iodo-6-ethoxy-aniline
3-methyl-4-chlor-aniline
3-brom-6-ethoxy-aniline
3-chlor-6-ethoxy-aniline
3-ethoxy-aniline
3-phenoxy-aniline
3-methoxy-aniline
3-brom-6-phenoxy-aniline
3-iodo-6-phenoxy-aniline
3-brom-6-methyl-aniline
3-chlor-6-methyl-aniline
3-methyl-aniline
3-brom-5-methyl-aniline
3-chlor-6-phenoxy-aniline
2:5-dimethyl-4-chlor-aniline
4-ethyl-aniline
4-benzo-trifluor-aniline
4-chlor-2methoxy-aniline
4-brom-2-methoxy-aniline
4-brom-2-ethoxy-aniline
4-iodo-2-methoxy-aniline
4-methoxy-aniline
4-chlor-2-ethoxy-aniline
4-phenoxy-aniline
4-ethoxy-aniline
4-brom-2-phenoxy-aniline
4-methoxy-2-chlor-aniline
4-chlor-2-methyl-aniline
4-chlor-2-methyl-aniline
4-methyl-3-brom-aniline
4-brom-5-methyl-aniline
4-methyl-2chlor-aniline
4-methyl-aniline 4-chlor-2:5-dimethyl-aniline
4-chlor-2-phenoxy-aniline
4-methoxy-2-chlor-aniline
4-phenoxy-2chlor-aniline
4-chlor-2:5-diethoxy-aniline
3-chlor-2-methyl-aniline
3-chlor-2-methoxy-aniline
alpha-naphthylamine
beta-naphthylamine The above amines are diazotized in the usual manner and their diazo compounds ares stabilized in the manner described in Lubs-*The Chemistry of Synthetic Dyes and Pigments* pp. 217-221; Rheinhold, N.Y. 1955, with amines which have at least one solubilizing group to thereby form a stabilized diazoamino compound or triazene. Such stabilizing amines are disclosed in Lubs and may be exemplified by, but not limited to:

ethylamino-acetic acid
dibenzylamine-disulfonic acid
4-sulfo-2-aminobenzoic acid
5-sulfo-2-aminobenzoic acid
1-aminobenzene-2:5-disulfonic acid
1-methyl-2-ethyl-aminobenzene-4-sulfonic acid
4-amino-5-methylbenzene-2-sulfanilide
1-aminonaphthalene-2:4-disulfonic acid
1-aminobenzene-2:3-dicarboxylic acid
methylamino-ethane-sulfonic acid
1-methylaminobenzene-4-sulfonic acid
butylamino-acetic acid
cyclohexylamino-acetic acid
2-ethylamino-1-methylbenzene-4-sulfonic acid
1-aminobenzene-3:5-dicarboxylic acid
3-aminobenzene-1:2-dicarboxylic acid
2-methylamino-4-sulfobenzoic acid
ethyl-glucamine
cyclohexyl-glucamine
benzyl-xylamine
methyl-erythramine
ethyl-galactamine
amyl-arabinamine
methyl-mannamine
glycine
piperidine-$\alpha$-carboxylic acid
pyrrolidine-$\alpha$-carboxylic acid
guanylurea-N-sulfonic acid
guanyltaurine
guanylglycine
guanylsulfanilic acid
diethyloldicyandiamine
sulfocarboxyquinoline
cyanamid Coupling components which are useful in connection with the instant invention may be exemplified by, but are not limited to:

3-hydroxy-2-naphthanilide
3-hydroxy-2',5'-dimethoxy-2-naphthanilide
3-hydroxy-2-naphth-o-toluidide
3-hydroxy-2-naphth-5-methyl-o-anisidide
3-hydroxy-2-naphth-5-chloro-o-toluidide
3-hydroxy-2-naphth-2,4-xylidide
3-hydroxy-2-naphth-o-anisidide
3-hydroxy-N-(1-napthyl)-2-naphthamide
3-hydroxy-2-anthra-o-toluidide
2-hydroxy-4'-chloro-3-carbazolecarboxyarylide
bisacetoacetbenzidide
N-(1-naphthyl)acetoacetamide
acetoacet-4'-chloro-2',5'-dimethyoxyanilide
1-(2,5-dimethoxyphenyl)-3-methyl-5-pyrazolone
1-(2-nitrophenylazo)-4-amino-6-hydroxynaphthalene
6-(5-chloro-2-hydroxyphenylazo)resorcinol, copper salt The solution of the instant invention may then be padded on a cellulosic material such as cotton, paper, cotton polyester mixed fiber, etc., or if the solution has been thickened to printing consistency, the material is then printed. The color is developed by exposing the padded fiber to heat such as superheated steam at 400° F. or dry heat for up to 3 minutes as high as 425° F. or by aging in neutral steam for 1-2 minutes.

It is noted that by employing the primary amine of the instant invention in the neutral dyeing of azoic colors, one obtains improved coupling of the diazoamino compound and furthermore one obtains an improved splitting of the diazo compound especially if said diazo compound is of the "slow" splitting" type than with prior art processes when the steam is employed.

In addition to the oxygen-containing primary amine and preferably a sulfonated long chain carboxylic acid, one may also incorporate into the composition of the instant invention antifoam agents to control the foaming thereof. Any commercially available antifoaming agents may be employed in an amount which is effective for the control of foam formation. One type of antifoam agent which may be employed is of the silicone type, such as DC antifoam (Dow Corning).

The present invention will now be described by reference to the following specific examples. Such examples are presented for purposes of illustration only, and the present invention is in no way to be deemed as limited thereto.

EXAMPLE 1

The following azoic solution was prepared:

|  | Parts |
|---|---|
| 3-hydroxy-2naphth-o-phenetidide | 17.0 |
| Diethylene glycol | 5.0 |
| Diethylene glycol ethyl ether | 10.0 |
| Methoxypropylamine | 35.0 |
| Acetylenic glycol 2,4,7,9-tetramethyl-5-decyne-4,7-diol in ethylene glycol solution | 1.0 |
| Water | 17.0 |
| 5-chloro-o-toluidine diazo stabilized with sarcosine (81% conc.) | 15.0 |

EXAMPLE 2

The following azoic solution was prepared:

|  | Parts |
|---|---|
| 3-hydroxy-2-naphth-o-phenetidide | 17.0 |
| Methoxypropylamine | 35.0 |
| Acetylenic glycol 2,4,7,9-tetramethyl-5-decyne-4,7-diol in ethylene glycol solution | 1.0 |
| Sodium hydroxide 40°Be' | 3.5 |
| Water | 28.5 |
| 5-chloro-o-toluidine diazo stabilized with sarcosine (81% conc.) | 15.0 |

EXAMPLE 3

The following azoic solution was prepared:

|  | Parts |
|---|---|
| 3-hydroxy-2-naphth-o-phenetidide | 17.0 |
| Diethylene glycol ethyl ether | 15.0 |
| Methoxypropylamine | 35.0 |
| Acetylenic glycol 2,4,7,9-tetramethyl-5decyne-4,7-diol in ethylene glycol solution | 1.0 |
| Sodium hydroxide 40°Be' | 3.5 |
| Water | 9.5 |
| 5-chloro-o-toluidine diazo stabilized with cyanamid (58% conc.) | 19.0 |

In Examples 1 through 3 clear solutions were obtained with the compositions employed.

EXAMPLE 4

Examples 1 through 3 were repeated with the exception that methoxypropylamine was substituted by an equivalent amount of diethylaminoethanol. In all three repeated examples a clear solution was not obtained. The composition of Example 1 with the methoxypropylamine substituted by an equivalent amount of diethylaminoethanol had the highest solids content. These examples demonstrate that under similar conditions the use of the primary amine, methoxypropylamine, due to its higher solvent power, will form an azoic solution even in the absence of caustic, whereas the accepted commercial developer, diethylaminoethanol, will not.

EXAMPLE 5

The following azoic solution was prepared:

|  | Parts |
|---|---|
| 3-hydroxy-2-naphth-o-toluidide | 17.0 |
| Diethylene glycol | 5.0 |
| Diethylene glycol ethyl ether | 10.0 |
| Methoxypropylamine | 35.0 |
| Acetylenic glycol 2,4,7,9-tetramethyl-5-decyne-4,7-diol in ethylene glycol solution | 1.0 |
| Water | 11.0 |
| 5-chloro-o-toluidine diazo stabilized with sarcosine (81% conc.) | 21.0 |

EXAMPLE 6

The following azoic solution was prepared:

|  | Parts |
|---|---|
| 3-hydroxy-2-naphth-o-toluidide | 17.0 |
| Methoxypropylamine | 35.0 |
| Acetylenic glycol 2,4,7,9-tetramethyl-5-decyne-4,7-diol in ethylene glycol solution | 1.0 |
| Sodium hydroxide 40°Be' | 1.0 |
| Water | 25.0 |
| 5-chloro-o-toluidine diazo stabilized with sarcosine (81% conc.) | 21.0 |

EXAMPLE 7

The following azoic solution was prepared:

|  | Parts |
|---|---|
| 3-hydroxy-2-naphth-o-toluidide | 17.0 |
| Methoxypropylamine | 35.0 |
| Acetylenic glycol 2,4,7,9-tetramethyl-5-decyne-4,7-diol in ethylene glycol solution | 1.0 |
| Sodium hydroxide 40°Be' | 1.0 |
| Water | 25.0 |
| 5-chloro-o-toluidine diazo stabilized with cyanamid (58% conc.) | 21.0 |

In all three cases clear solutions were obtained, but when the examples were repeated substituting for the methoxypropylamine the commercial developer diethylaminoethanol the solutions were not clear and contained sediment.

EXAMPLE 8

The following azoic solution was prepared:

|  | Parts |
|---|---|
| Bis(acetoacet)-o-tolidide | 9.2 |
| Diethylene glycol ethyl ether | 20.0 |
| Methoxypropylamine | 5.0 |
| Acetylenic glycol 2,4,7,9-tetramethyl-5-decyne-4,7-diol in ethylene glycol solution | 1.0 |
| Sodium hydroxide 40°Be' | 4.0 |
| Water | 46.8 |
| 5-chloro-o-toluidine diazo stabilized with sarcosine (81% conc.) | 14.0 |

The solution was clear, but when a similar solution was prepared wherein diethylaminoethanol was substituted for the methoxypropylamine the solution contained solids.

EXAMPLE 9

The following azoic solution was prepared:

|  | Parts |
|---|---|
| 3-hydroxy-2-naphth-o-anisidide | 17.8 |
| Methoxypropylamine | 35.0 |
| Acetylenic glycol 2,4,7,9-tetramethyl-5-decyne-4,7-diol in ethylene glycol solution | 1.0 |
| Diethylene glycol ethyl ether | 10.0 |
| Sodium hydroxide 40°Be' | 1.0 |
| Water | 62.0 |
| 5-chloro-o-anisidine, diazotized and stabilized with methyltaurine, (80% conc.) | 23.0 |

A clear red solution was produced. However, when the methoxypropylamine was substituted by diethylethanolamine, solids were present in the solution.

EXAMPLE 10

The following azoic solution was prepared:

|  | Parts |
|---|---|
| 3-hydroxy-2-naphth-o-phenetidide | 13.0 |
| Methoxypropylamine | 35.0 |
| Acetylenic glycol 2,4,7,9-tetramethyl-5-decyne-4,7-diol in ethylene glycol solution | 1.0 |
| Diethylene glycol ethyl ether | 20.0 |
| Sodium hydroxide 40°Be' | 2.0 |
| Water | 56.0 |
| N,N,4-trimethylmethanilide, diazotized and stabilized N-methyl-5-sulfoanthranilic acid (78% conc.) | 23.0 |

This solution was clear, but a solution prepared wherein diethylaminoethanol was substituted for the methoxypropylamine contained solids.

EXAMPLE 11

The following azoic solution was prepared:

|  | Parts |
|---|---|
| 3-hydroxy-2-naphth-o-anisidide | 15.0 |
| Methoxypropylamine | 35.0 |
| Acetylenic glycol 2,4,7,9-tetramethyl-5-decyne- 4,7-diol in ethylene glycol solution | 1.0 |
| Diethylene glycol ethyl ether | 10.0 |
| Sodium hydroxide 40°Be' | 2.0 |
| Water | 57.0 |
| 4-cyano-2,5Dimethoxyaniline, diazotized and stabilized with N-methyl-5-sulfoanthranilic acid (70% conc.) | 30.0 |

A clear solution was produced, but when a solution was produced wherein the methoxypropylamine was substituted by diethylethanolamine solids were present in the solution.

EXAMPLE 12

The following azoic solution was prepared:

|  | Parts |
|---|---|
| 3-hydroxy-2-naphthanilide | 11.0 |
| Methoxypropylamine | 35.0 |
| Acetylenic glycol 2,4,7,9-tetramethyl-5-decyne-4,7-diol in ethylene glycol solution | 1.0 |
| Sodium hydroxide 40°Be' | 1.0 |
| Water | 42.2 |
| Dianisidine, tetrazotized and stabilized with methyltaurine, (87% conc.) | 9.8 |

This solution was clear, but a solution made in similar manner, only substituting diethylaminoethanol for the methoxypropylamine, contained solids.

EXAMPLE 13

The following azoic solution was prepared:

|  | Parts |
|---|---|
| 5-amino-8-(phenylazo)-2-naphthol | 7.0 |
| Methoxypropylamine | 15.0 |
| 1-methyl-2-pyrrolidone | 8.0 |
| Thiodiglycol | 8.0 |
| Acetylenic glycol 2,4,7,9-tetramethyl-5-decyne-4,7-diol in ethylene glycol solution | 1.0 |
| Sodium hydroxide 40°Be' | 1.0 |
| Water | 47.0 |
| Dianisidine, tetrazotized and stabilized with methyltaurine (87% conc.) | 13.0 |

A clear solution was produced. However, when diethylethanolamine was substituted for the methoxypropylamine the solution contained solids.

EXAMPLE 14

A composition was prepared comprising:

|  | Parts |
|---|---|
| Urea | 20.0 |
| Polygum 260 (5%) (thickener) | 40.0 |
| Polyvinylpyrrolidone (K-30)-30% aqueous solution | 2.0 |
| 3-hydroxy-2-naphth-o-phenetidide (17 parts) | |
| Diethylene glycol (5 parts) | |
| Diethylene glycol ethyl ether (10 parts) | |
| Methoxypropylamine (35 parts) | |
| Acetylenic glycol 2,4,7,9-tetramethyl-5-decyne-4,7-diol in ethylene glycol solution (1 part) | 10.0 |
| Water (17 parts) | |
| 5-chloro-o-toluidine diazo stabilized with sarcosine (81% concentrate) (15 parts) | |
| Water | 28.0 |

The resultant paste was printed on three swatches of cotton cloth and the prints were dried and developed. One swatch was dried and developed by treatment with dry heat for three minutes at 350° F. The second swatch was aged in neutral steam at atmospheric pressure for 1 minute. The third swatch was treated with superheated steam at 400° F. for 2 minutes. In all cases full color developed. The development was attributed to the evaporation of the volatile amine as no fixed alkali was present in the composition of this example.

EXAMPLE 15

A composition was prepared comprising:

|  | Parts |
|---|---|
| Urea | 20.0 |
| Polygum 260 (5%) (thickener) | 40.0 |
| Polyvinylpyrrolidone | 2.0 |
| 25 parts methoxypropylamine | |
| 20 parts diethylene glycol | 3.0 |
| 25 parts α-sulfostearic acid | |
| 3-hydroxy-2-naphth-o-phenetidide (17 parts) | |
| Methoxypropylamine (35 parts) | |
| Acetylenic glycol 2,4,7,9-tetramethyl-5-decyne-4,7-diol in ethylene glycol solution (1 part) | |
| Sodium hydroxide 40° Be' (3.5 parts) | 10.0 |
| Water (28.5 parts) | |
| 5-chloro-o-toluidine diazo stabilized with sarcosine (81% concentrate) (15.0 parts) | |
| Water | 25.0 |

The resultant paste was printed on three swatches of cotton cloth and the prints were then dried and developed by treating the first swatch with dry heat for 3 minutes at 350° F. The second swatch was aged in neutral steam at atmospheric pressure for 1 minute. The third swatch was treated with superheated steam at 400° F. for 2 minutes. In all cases full color developed.

EXAMPLE 16

A composition was prepared comprising:

|  | Parts |
|---|---|
| Urea | 20.0 |
| Polygum 260 (5%) (thickener) | 40.0 |
| Polyvinylpyrrolidone (K-30)-30% aqueous solution | 2.0 |
| 25 parts methoxypropylamine | |
| 20 parts diethylene glycol | 3.0 |
| 25 parts α-sulfostearic acid | |
| 3-hydroxy-2-naphth-o-phenetidide (17 parts) | |
| Diethylene glycol ethyl ether (15.0) | |
| Methoxypropylamine (35 parts) | |
| Acetylenic glycol 2,4,7,9-tetramethyl-5-decyne-4,7-diol in ethylene glycol solution (1 part) | 10.0 |
| Sodium hydroxide 40° Be' (3.5 parts) | |
| Water (9.5 parts) | |
| 5-chloro-o-toluidine diazo stabilized with cyanamid (58% concentrate) (19.0 parts) | |
| Water | 25.0 |

The resultant paste was printed on three swatches of cotton cloth and the prints were then dried and developed by treating the first swatch with dry heat for 3 minutes at 350° F. The second swatch was aged in neutral steam at atmospheric pressure for 1 minute. The third swatch was treated with superheated steam at 400° F. for 2 minutes. In all cases full color developed.

EXAMPLE 17

A composition was prepared comprising:

| | Parts |
|---|---|
| Urea | 20.0 |
| Polygum 260 (5%) (thickener) | 40.0 |
| Polyvinylpyrrolidone | 2.0 |
| 3-hydroxy-2-naphth-o-toluidide (17 parts) | |
| Diethylene glycol (5 parts) | |
| Diethylene glycol ethyl ether (10 parts) | |
| Methoxypropylamine (35 parts) | |
| Acetylenic glycol 2,4,7,9-tetramethyl-5-decyne-4,7-diol in ethylene glycol solution (1 part) | 10.0 |
| Water (11 parts) | |
| 5-chloro-o-toluidine diazo stabilized with sarcosine (81% concentrate) (21 parts) | |
| Water | 28.0 |

The resultant paste was printed on three swatches of cotton cloth and the prints were dried and developed. One swatch was dried and developed by treatment with dry heat for 3 minutes at 350° F. The second swatch was aged in neutral steam at atmospheric pressure for 1 minute. The third swatch was treated with superheated steam at 400° F. for 2 minutes. In all cases full color developed. The development was attributed to the evaporation of the volatile amine as no fixed alkali was present in the composition of this example.

EXAMPLE 18

A composition was prepared comprising:

| | Parts |
|---|---|
| Urea | 20.0 |
| Polygum 260 (5%) (thickener) | 40.0 |
| Polyvinylpyrrolidone | 2.0 |
| 25 parts methoxypropylamine | |
| 20 parts diethylene glycol | |
| 25 parts α-sulfostearic acid | 3.0 |
| 3-hydroxy-2-naphth-o-toluidide (17 parts) | |
| Methoxypropylamine (35 parts) | |
| Acetylenic glycol 2,4,7,9-tetramethyl-5-decyne-4,7-diol in ethylene glycol solution (1 part) | |
| Sodium hydroxide 40° Bé. (1 part) | 10.0 |
| Water (25 parts) | |
| 5-chloro-o-toluidine diazo stabilized with sarcosine (81% concentrate) (21 parts) | |
| Water | 25.0 |

The resultant paste was printed on three swatches of cotton cloth and the prints were then dried and developed by treating the first swatch with dry heat for 3 minutes at 350° F. The second swatch was aged in neutral steam at atmospheric pressure for 1 minute. The third swatch was treated with superheated steam at 400° F. for 2 minutes. In all cases full color developed.

EXAMPLE 19

A composition was prepared comprising:

| | Parts |
|---|---|
| Urea | 20.0 |
| Polygum 260 (5%) (thickener) | 40.0 |
| Polyvinylpyrrolidone | 2.0 |
| 25 parts methoxypropylamine | |
| 20 parts diethylene glycol | |
| 25 parts α-sulfostearic acid | 3.0 |
| 3-hydroxy-2-naphth-o-toluidide (17 parts) | |
| Methoxypropylamine (35 parts) | |
| Acetylenic glycol 2,4,7,9-tetramethyl-5-decyne-4,7-diol in ethylene glycol solution (1 part) | |
| Sodium hydroxide 40° Bé. (1 part) | 10.0 |
| Water (25 parts) | |
| 5-chloro-o-toluidine diazo stabilized with cyanamid (58% concentrate) (21 parts) | |
| Water | 25.0 |

The resultant paste was printed on three swatches of cotton cloth and the prints were then dried and developed by treating the first swatch with dry heat for 3 minutes at 350° F. The second swatch was aged in neutral steam at atmospheric pressure for 1 minute. The third swatch was treated with superheated steam at 400° F. for 2 minutes. In all cases full color developed.

EXAMPLES 20–26

The compositions of examples 1 through 6 were prepared with the exception that diethylethanolamine was substituted for the methoxypropylamine employed therein. As previously stated, the solutions contained solids and were therefore filtered. The filtered solutions were then thickened to printing consistency and printed on cotton cloth samples, dried and developed in the manner employed in examples 14–19. In all cases the color which developed was dull, indicating that full color value was not obtained.

EXAMPLE 27

A composition comprising the following was prepared:

| | Parts |
|---|---|
| Urea | 20.0 |
| Polygum 260 (5%) thickener | 40.0 |
| Polyvinyl pyrrolidone | 2.0 |
| 3-hydroxy-2-naphth-o-phenetidide (17 parts) | |
| Methoxypropylamine (35 parts) | |
| Acetylenic glycol 2,4,7,9-tetramethyl-5-decyne-4,7-diol in ethylene glycol solution (1 part) | 10.0 |
| Sodium hydroxide 40° Bé. (3.5 parts) | |
| Water (28.5 parts) | |
| 5-chloro-o-toluidine diazo stabilized with sarcosine (81% concentrate) (15 parts) | |
| Developer: | |
| Methoxypropylene (25 parts) | |
| Diethylene glycol (20 parts) | 3.0 |
| α-Sulfostearic acid (25 parts) | | to which was added 4 parts of a dye having the formula:

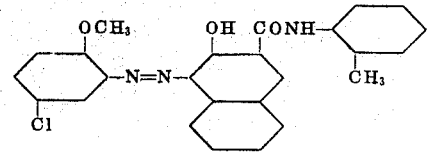

and 21 parts water. A Dacron cotton fabric (65–35) was printed with the resultant paste. The fabric was then dried and cured for 1½ minutes at 425° F., rinsed and scoured for 3 minutes at 200° F. A bright scarlet was obtained on the mixed fiber.

EXAMPLE 28

The following composition was prepared:

| | Parts |
|---|---|
| Urea | 30.0 |
| Warm water | 30.0 |
| Polyvinyl pyrrolidone | 2.0 |
| Azoic developer comprising: | |
| Methoxypropylene (25 parts) | |
| Diethylene glycol (20 parts) | 3.0 |
| α-Sulfostearic acid (25 parts) | |
| Kelgin (1:100, a highly refined algin product) | 20.0 |
| 3-hydroxy-2-naphth-o-phenetidide (17 parts) | |
| Diethylene glycol (5 parts) | |
| Diethylene glycol ethyl ether (10 parts) | |
| Methoxypropylamine (35 parts) | |
| Acetylenic glycol 2,4,7,9-tetramethyl-5-decyne-4,7-diol in ethylene glycol solution (1 part) | 10.0 |
| Water (17 parts) | |
| 5-chloro-o-toluidine diazo stabilized with sarcosine (81% concentrate) (15 parts) | |
| Water | 38.0 |

Swatches of cotton muslin and cotton corduroy were padded with the solution and the swatches were then dried and developed. One cotton muslin swatch and one cotton corduroy swatch were developed and dried by exposure to dry heat for 3 minutes at 350° F. A second set of cotton muslin and cotton corduroy swatches was developed by exposing to dry heat for 1 minute at 400° F. In all cases full color developed and the fabric had good fastness to light, washing, dry cleaning and sublimation.

EXAMPLE 29

The composition of example 28 was prepared, to which was added 8 parts of a dye having a formula:

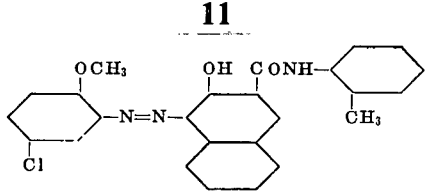

and 3 parts dispersed dye from 5-chloro-o-toluidine diazotized and coupled with 3-hydroxy-2-naphtho-o-toluidide. This composition was padded on to a polyester cotton (65:35) swatch and cured at 425° F. for 1½ minutes. The swatch developed full color and the fabric had good fastness to light, washing, dry-cleaning and sublimation.

EXAMPLE 30

The following composition was prepared:

| | Parts |
|---|---|
| Urea | 20.0 |
| Polygum 250 (5%) (thickener) | 40.0 |
| Polyvinyl pyrrolidone | 2.0 |
| Azoic developer comprising: | |
| Methoxypropylene (25 parts) | |
| Diethylene glycol (20 parts) | 3.0 |
| α-sulfostearic acid (25 parts) | |
| The composition of Example 8 | |
| Water | 25.0 |

The product was padded on to a cotton material and developed as in examples 28 and 29. In all cases solid shades having full color value were produced.

EXAMPLE 31

The composition of example 30 was prepared, to which was added 8 parts of a dispersed dye from 4'-aminobenzanilide diazotized and coupled with paracresol in place of 8 parts of water. The solution was padded on to polyester-cotton (65:35) material and developed as in example 30. Solid shades having full color value were produced.

EXAMPLE 32

A composition comprising the following was prepared:

| | Parts |
|---|---|
| Urea | 30.0 |
| Water | 30.0 |
| Polyvinylpyrrolidone | 2.0 |
| Azoic developer comprising: | |
| 25 parts methoxypropylamine | |
| 20 parts diethylene glycol | 3.0 |
| 25 parts α-sulfostearic acid | |
| Kelgin (1:100) | 20.0 |
| Product of Example 8 | 10.0 |
| Dispersed dye from 4'-aminobenzanilide diazotized and coupled with paracresol | 8.0 |
| Water | 30.0 |

The product was padded on to polyester-cotton (65:35) material and developed as in Example 30. Solid shades having full color value were produced.

EXAMPLES 33–37

The following compositions were prepared:

| | Parts | | | | |
|---|---|---|---|---|---|
| Polygum 260 (5%) | 40.0 | 40.0 | 40.0 | 40.0 | 40.0 |
| Urea | 20.0 | 20.0 | 20.0 | 20.0 | 20.0 |
| Polyvinylpyrrolidone | 2.0 | 2.0 | 2.0 | 2.0 | 2.0 |
| Azoic developer | 3.0 | 3.0 | 3.0 | 3.0 | 3.0 |
| Solution of Example: | | | | | |
| 9 | 15.0 | | | | |
| 10 | | 15.0 | | | |
| 11 | | | 15.0 | | |
| 12 | | | | 15.0 | |
| 13 | | | | | 15.0 |
| Water | 20.0 | 20.0 | 20.0 | 23.0 | 15.0 |

These pastes were printed on cotton cloth, dried and developed in the manner of Examples 14–19. In all cases full color developed.

EXAMPLE 38

An azoic solution was compounded according to the formulation of Example 2 with the exception that ethoxyethylamine was used instead of methoxypropylamine. The resulting solution was compounded into a printing paste in the manner of examples 14–19, printed on cotton, dried and developed with dry heat for 3 minutes at 350° F. As in the previous examples, full color developed.

EXAMPLE 39

An azoic solution was compounded according to the formulation of example 2, with the exception that methoxybutylamine replaced methoxypropylamine therein. The resulting solution was compounded into a printing paste in the manner of examples 14–19, printed on cotton, dried and developed with dry heat for 3 minutes at 350° F. As in the previous examples, full color developed.

EXAMPLE 40

An azoic solution was prepared wherein α-sulfolauric acid replaced α-sulfostearic acid in equivalent amounts. Example 15 was then repeated with the substitution of the azoic solution of this example. Full color value resulted on development in the manner of example 39.

EXAMPLE 41

An azoic solution was prepared wherein α-sulfopalmitic acid replaced α-sulfostearic acid in equivalent amounts. Example 15 was then repeated with the substitution of the azoic solution of this example. Full color value resulted on development in the manner of example 40.

EXAMPLES 42–48

The following compositions were prepared:

| | Parts |
|---|---|
| Urea | 30.0 |
| Hot water | 40.0 |
| Polyvinyl pyrrolidone | 2.0 |
| Azoic developer comprising: | |
| Methoxypropylamine (25 parts) | |
| Diethylene glycol (20 parts) | 3.0 |
| α-sulfostearic acid (25 parts) | | a. to which 10 parts of the product of example 8 (fast splitting) was added.
b. to which 10 parts of the product of Example 8 with 5-chloro-o-toluidine diazo stabilized with cyanamide (fast splitting) was substituted for the sarcosine stabilized diazo compound was added. (slow splitting)
c. to which 10 parts of the product of example 3 was added.
d. to which 10 parts of the product of example 4 was added.
e. to which 10 parts 1-(p-aminophenyl)-3-methyl-5-pyrazolone reacted with nickel phthalocyanine sulfonyl chloride (coupler) and 5-chloro-o-toluidine diazo stabilized with cyanamid (diazo) (fast splitting) was added.
f. to which 10 parts of a solution comprising 4'-chloro-2-hydroxy3-carboxanilide (coupler) and 5-chloro-o-toluidine diazo stabilized with cyanamid (azo) (fast splitting) was added.
g. to which 10 parts of a solution comprising 4'-chloro-2-hydroxy-3-carboxanilide (coupler) and p-toluidine diazo stabilized with sarcosine was added.

The The volume of each was adjusted to 133 cc. with hot water. Filter paper, and also bond paper were passed through these solutions at about 75°–90° F. The papers were then exposed to a temperature of about 85° C. The fast splitting types developed full color on drying whereas the slow splitting types required about one-half hour at this temperature to develop full color. Under conditions of paper manufacture where the temperature is higher, the colors can be expected to develop fully in less time.

EXAMPLES 49–56

A composition comprising the following was prepared:

| | | Parts |
|---|---|---|
| I. | Polygum 260 (5%) | 45 |
| | Urea | 20 |
| | Polyvinyl pyrrolidone (K30) 30% aqueous solution | 2 | a. To the above composition was added 10 parts of the composition comprising

| | Parts |
|---|---|
| 2-hydroxy-3-carbazole carbox-p-chloroanilide | 7.5 |
| 3-methoxypropylamine | 40 |
| Ethoxyethanol | 5 |
| Caustic soda flakes | 2 |
| Water | 45.5 | and 1.5 parts of p-toluidine diazo stabilized with cyanamid.

b. The composition of (a) was prepared with the exception that 2.5 parts of 5-nitro-o-anisidine diazo stabilized was substituted for 1.5 parts of p-toluidine diazo stabilized with cyanamid.

c. To the above composition (I) was added 10 parts of the composition comprising

| | Parts |
|---|---|
| 2-hydroxy-2',5'-dimethoxy-3-dibenzofuranecarboxanilide | 7.5 |
| 3-methoxypropylamine | 40 |
| Ethoxyethanol | 5 |
| Caustic soda flakes | 2 |
| Water | 45.5 | and 1.4 parts of 5-chloro-o-toluidine diazo stabilized with cyanamide.

d. The composition of (c) was prepared with the exception that 2.5 parts of 5-nitro-o-anisidine diazo stabilized was substituted for 1.4 parts of 5-chloro-o-toluidine diazo stabilized with cyanamide.

e. To the above composition (I) was added 10 parts of the composition comprising

| | Parts |
|---|---|
| 2-hydroxy-5'-methyl-3-dibenzofuranecarbox-o-anisidide | 7.5 |
| 3-Methoxypropylamine | 40 |
| Ethoxyethanol | 5 |
| Caustic soda flakes | 2 |
| Water | 45.5 | and 1.4 parts of 5-chloro-o-toluidine diazo stabilized with cyanamide.

f. The composition of (e) was prepared with the exception that 1.5 parts of p-Toluidine diazo stabilized with cyanamide was substituted for 1.4 parts of 5-chlor-o-toluidine diazo stabilized with cyanamide.

g. The composition of (e) was prepared with the exception that 2.5 parts of 5-Nitro-o-anisidine diazo stabilized was substituted for 1.4 parts of 5-chloro-o-toluidine diazo stabilized with cyanamide.

h. To the above composition (I) was added 10 parts of the composition comprising

| | Parts |
|---|---|
| 2-hydroxy-11-benzo[a]carbazole-3-carbox-p-anisidide | 7.5 |
| 3-Methoxypropylamine | 40 |
| Ethoxyethanol | 5 |
| Caustic soda flakes | 2 |
| Water | 45.5 | and 2.4 parts of 5-Nitro-o-anisidine diazo stabilized.

The resultant pastes were printed on cotton swatches and the prints were then treated and developed for 1½ minutes at 425° F. In all cases, full color developed.

EXAMPLE 57

Examples 14 through 19 were repeated with the exception that 2.5 parts of a composition comprising:

| | Parts |
|---|---|
| DC antifoam agents | 30 |
| Sodium sulfate | 970 | was added to the compositions of said examples. The pastes were printed in the manner described in examples 14 through 19 and prints made therefrom developed full color value. In addition, the foaming properties of the composition were inhibited.

What is claimed is:

1. In the method of neutral steam developing of azoic dyes, the improvement which comprises applying to the material to be dyed a developer composition comprising coupling component, diazoamino compound, an oxygen-containing primary amine having the formula:

$$R-O-(CH_2)_n-NH_2$$

wherein R represents an alkyl radical having from 1–4 carbon atoms, n represents an integer of from 2–4, and the total carbon atoms in the molecule range from 3–5.

2. In the method of neutral steam developing of azoic dyes, the improvement which comprises applying to the material to be dyed a developer composition comprising coupling component, diazoamino compound, an oxygen-containing primary amine having the formula:

$$R-O-(CH_2)_n-NH_2$$

wherein R represents an alkyl radical having from 1–4 carbon atoms, n represents an integer of from 2–4, and the total carbon atoms in the molecule range from 3–5, and a sulfonated long-chain monocarboxylic acid.

3. The method of claim 1 wherein the oxygen-containing primary amine is methoxypropylamine.

4. The method of claim 2 wherein the oxygen-containing primary amine is methoxypropylamine.

5. The method of claim 2 wherein the sulfonated long-chain monocarboxylic acid has from 12–18 carbon atoms.

6. The method of claim 2 wherein the sulfonated long-chain monocarboxylic acid is α-sulfostearic acid.

7. The method of claim 2 wherein the sulfonated long-chain monocarboxylic acid is α-sulfolauric acid.

8. The method of claim 2 wherein the sulfonated long-chain monocarboxylic acid is α-sulfopalmitic acid.

9. An azoic dye composition comprising coupling component, diazoamino compound, and an oxygen-containing primary amine having the formula:

$$R-O-(CH_2)_n-NH_2$$

wherein R represents an alkyl radical having from 1–4 carbon atoms, n represents an integer of from 2–4, and the total carbon atoms in the molecule range from 3–5.

10. The composition of claim 9 wherein the oxygen-containing primary amine is methoxypropylamine.

11. An azoic dye composition comprising coupling component, diazoamine compound, and an oxygen-containing primary amine having the formula:

R–O–(CH$_2$)$_n$–NH$_2$ wherein R represents an alkyl radical having from 1–4 carbon atoms, $n$ represents an integer of from 2–4, and there are between three and five carbon atoms in the molecule, and a sulfonated long-chain monocarboxylic acid.

12. The composition of claim 11 wherein the oxygen-containing primary amine is methoxypropylamine.

13. The composition according to claim 11 wherein the sulfonated long-chain monocarboxylic acid has from 12–18 carbon atoms.

14. The composition of claim 11 wherein the sulfonated long-chain monocarboxylic acid is α-sulfostearic acid.

15. The composition according to claim 11 wherein the sulfonated long-chain monocarboxylic acid is α-sulfolauric acid.

16. The composition according to claim 11 wherein the sulfonated long-chain monocarboxylic acid is α-sulfopalmitic acid.

* * * * *